United States Patent [19]
Yanez

[11] 3,752,983
[45] Aug. 14, 1973

[54] INFRARED VIEWING AND PHOTOGRAPHY
[75] Inventor: Serge J. Yanez, Arcadia, Calif.
[73] Assignee: Condamatic Company, Inc., Warren, Mich.
[22] Filed: Sept. 13, 1971
[21] Appl. No.: 180,044

[52] U.S. Cl..........................250/333, 250/213 R
[51] Int. Cl. ........................................... H01j 31/50
[58] Field of Search.................. 250/83.3 HP, 65 R, 250/65 F, 213 R

[56] References Cited
UNITED STATES PATENTS
| | | | |
|---|---|---|---|
| 2,482,815 | 9/1949 | Urbach......................... | 250/83.3 HP |
| 2,946,255 | 7/1960 | Bolay............................ | 250/83.3 HP |
| 3,327,120 | 6/1967 | Weiss............................ | 250/83.3 HP |
| 3,493,748 | 2/1970 | Tajima.......................... | 250/65 R |
| 3,247,378 | 4/1966 | Erikson......................... | 250/65 R |

OTHER PUBLICATIONS
Infra-Red View Miniscope Model 5500, Varo Inc., IEEE Convention, Mar. 25, 1963.

Primary Examiner—Harold A. Dixon
Attorney—Lyon & Lyon

[57] ABSTRACT

An infra red attachment for a single lens reflex 35mm camera body involves imaging optics within which are axially aligned a first lens system, an infra red image converter, and a second lens system, in that order. The first lens system serves to focus infra red on the converter. The second lens system serves to focus a visible image produced by the converter onto black and white type, slow speed film within the single lens reflex camera body which is releasably connected to such light tube whereby a person may see an infra red converted image just prior to its being photographed on black and white film in the camera body.

6 Claims, 3 Drawing Figures

INVENTOR
SERGE J. YANEZ
BY
Lyon & Lyon
ATTORNEYS

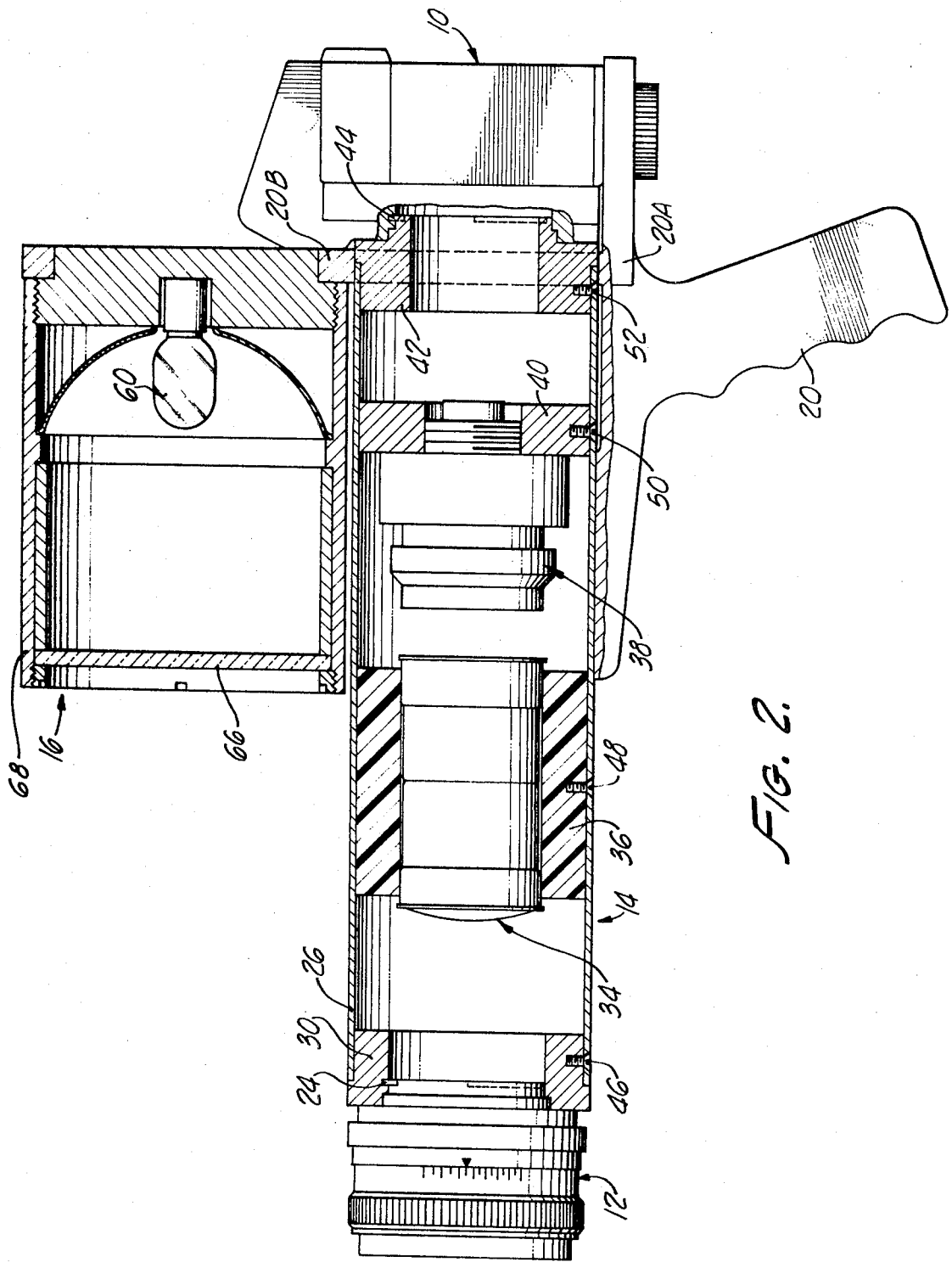

INFRARED VIEWING AND PHOTOGRAPHY

The present invention relates to photography and more particularly to infra red photography.

An object of the present invention is to provide means and techniques allowing most advantageous use of a conventional single lens reflex 35mm camera body in photographing images converted from infra red to visible light.

Another object of the present invention is to achieve infra red photography with film sensitive substantially only to the visible spectrum.

Another object of the present invention is to provide a light compact assembly for these purposes which is compact, of light weight and of good configuration for releasable attachment to 35 mm single lens reflex camera body.

Another object of the present invention is to provide a system in which a reflex camera body serves as a visual display element allowing the operator to observe distant objects or scenes under convert conditions as well as for photographing them for permanent record and furture display.

FIG. 2 is substantially a sectional view taken as indicated by the line 2—2 in FIG. 1.

The infra red camera assembly is exemplified as a standard 35 mm camera body 10 with its shutter in its focal plane.

The camera body 10 is of conventional construction, is of the standard 35 mm single lens reflex type, and may be of any one of the numerous camera bodies available for receiving and exposing conventional 35 mm black and white film and for transporting the same, frame by frame, from the film supply spool to a takeup spool and back again after transport of all frames onto the supply spool for subsequent development of the film.

The camera body 10 includes also a conventional so-called focal plane shutter which is located in the focal plane of the optical system and also an associated conventional viewing system that permits the user to see on a viewing screen, in focus, the same scene which is photographed upon depressing of the camera exposure button.

Usually upon operation of such button a mirror in the camera body is pivoted from a position where it reflects the scene onto said viewing screen to a position where it allows the light from such scene to impinge on the camera shutter which is then opened to permit exposure of the film having its plane slightly behind the shutter but in the exact focal plane.

Such conventional camera bodies have means such as, for example, bayonet type connections for the quick attachment and/or detachment of one of several different lens systems of different fixed or adjustable focal length. The apparatus presently described for infra red photography using black and white film in the camera body 10 includes conventional mating means that cooperates in conventional manner with the conventional means on the camera body 10 to provide the same quick attachable and detachable connection between itself and the camera body 10.

Figure 1:
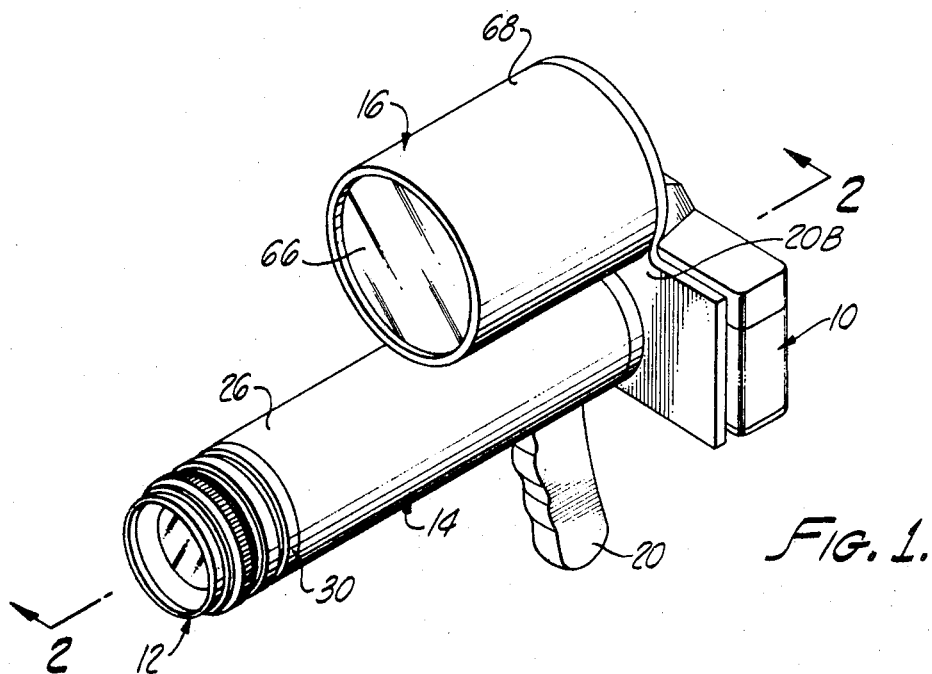
FIG. 1 illustrates a camera assembly embodying features of the present invention.
Figure 3:
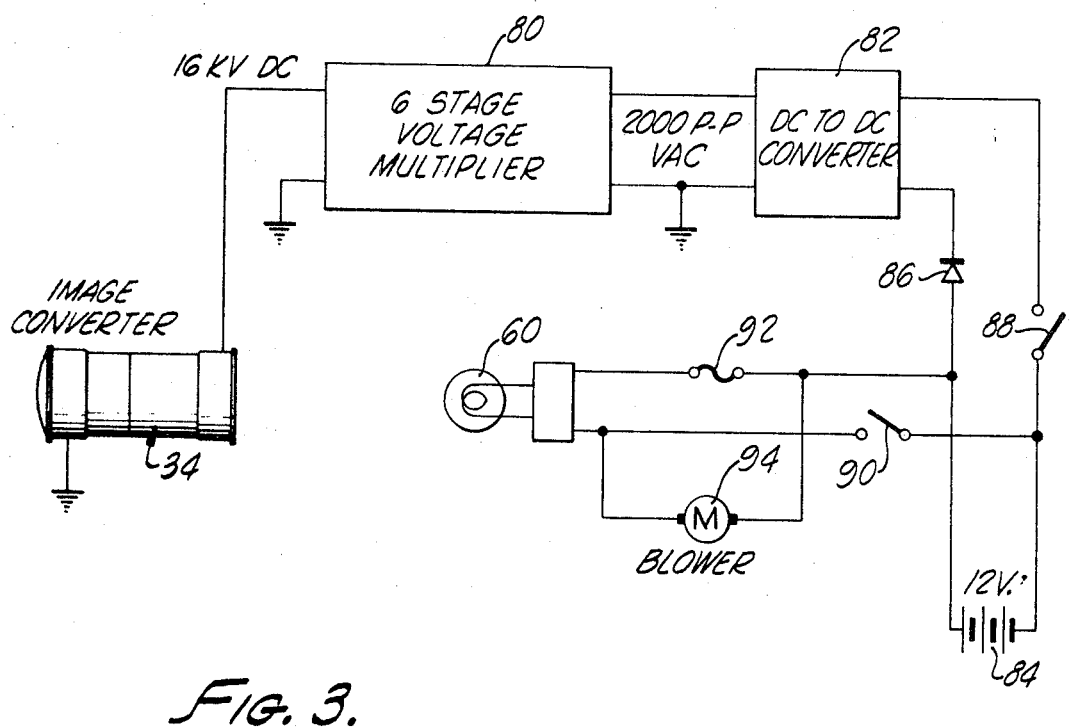
FIG. 3 illustrates electrical circuitry associated with the assembly of FIG. 1.

The new assembly attachable to such 35mm camera body 10 includes generally an objective lens system 12, an image converter assembly 14, a steady state convert light source 16, and high voltage power supply, all of which is mounted with a common hand grip 20. A portable power pack, operable from a 12 volt battery for energizing this assembly is shown in FIG. 3.

The objective lens assembly 12 is preferably a basic mirror lens selected for its spectral response to infra red light. It is appreciated that other similar lens systems may be used where different focal lengths are desired. Indeed the lens system 12 may have an F5.8 aperture with a focal length of 250mm specifically designed for 35mm single lens reflex camera applications. This lens assembly 12 provides a focus adjustment and is releasably secured by a bayonet type connection 24 to a light tube 26.

The image forming optics is housed on and in the image converter assembly 14 which includes tube 26, objective lens mount 30 incorporating connection 24, image converter tube 34, insulator housing 36, a 28 mm lens assembly 38 screw threadedly received in its mount 40 and a collar 42 incorporating a bayonet type connection 44 for securing the assembly to the camera body 10. The supports 30, 36, 40 and 42 may be secured to the tube 26 using machine screws 46, 48, 50 and 52 respectively.

The objective lens system 12 on its mount 30 forms an image on the forwardly located cathode screen of the image converter 34 which is then amplified and projected in the rearwardly located portion of the converter 34 in the form of a visible image. The short focal length F 2.8 mm lens 38 focuses the visible image onto the plane of the black and white type film in camera body 10. The single lens reflex camera body having features outlined above allows the operator to view the scene prior to photographing it using the visible focused image produced by lens system 38. If desired, the mountings 40 and 42 may be integrally formed.

The handle shaped supporting structure 20 upon which the tube 26 is mounted may be formed to also support various types of commercially available camera bodies in indexed relation to the tube 26. For that purpose the support 20 may incorporate a camera body locating apertured portion 20A.

The convert light source 16 is located above and on the frame portion 20B of such support structure 20 and may include a 30 watt lamp 60 and infra red filter 66 all within housing 68.

The image converter 34, preferably of high gain, is commercially available and may, for example, be the Model 1,653 supplied by Radio Corporation of America. The black and white type film used is Eastman Kodak Tri X or Panchromatic 135. In this system film otherwise not useful as such could be used in daytime infra red photography.

Convert scene illumination is provided by a quartz-iodine light source in conjunction with an infra red filter.

Various mounting means may be used. For example, the tripod mount of the camera body may be used and the mounting structure 20 in such case may be provided with different fittings adapting the same for support on the camera body.

In FIG. 3 the image converter 34 is supplied with a D.C. voltage of 16 kilovolts from the output of a six stage voltage multiplier 80 having its input receiving 2,000 volts A.C. from the output of a D.C. to D.C. converter 82, the input of converter 82 being connected to the 12 volt battery 84 via diode 86 and switch 88.

The light source 60 may be energized by the same source 84 via switch 90 and fuse 92. Also a blower 94 may be mounted to carry away heat developed by the light source 60 and it may be energized from the same source 84 via switch 90.

We claim:

1. An assembly for use on a reflex type camera body including an optical chamber having a first lens system, an image converter and a second lens system arranged in that order along an optical path, said first lens system focusing an infra red image on said converter, said converter converting said infra red image to a visible image and said second lens system serving to focus said visible image onto photographic film, said first system, said converter and second system being mechanically aligned with the axis of a light tube on which they are mounted, said light tube having means mounted thereon adapting the same for quick attachment and detachment from a reflex type camera body.

2. An assembly as set forth in claim 1 including a reflex type camera body attached to said light tube by said means mounted thereon for said quick attachment to and detachment from.

3. An assembly as set forth in claim 1 including an infra red light source mounted on said light tube for projecting infra red light generally along a prolongation of the axis of said tube.

4. An assembly as set forth in claim 1 in which said first lens system is adjustably mounted on said chamber with respect to said converter.

5. An assembly as set forth in claim 1 in which said second lens system is adjustably mounted with respect to said converter.

6. An arrangement as set forth in claim 1 including a portable power supply connected to said converter including a battery, a D.C. to D.C. converter having its input connected to said battery and its output connected to the input of a voltage multiplier having its output connected to said converter.

* * * * *